Feb. 3, 1959 L. E. MOHN 2,871,612
FISH HOOK RELEASE UNIT
Filed Feb. 27, 1957 3 Sheets-Sheet 1
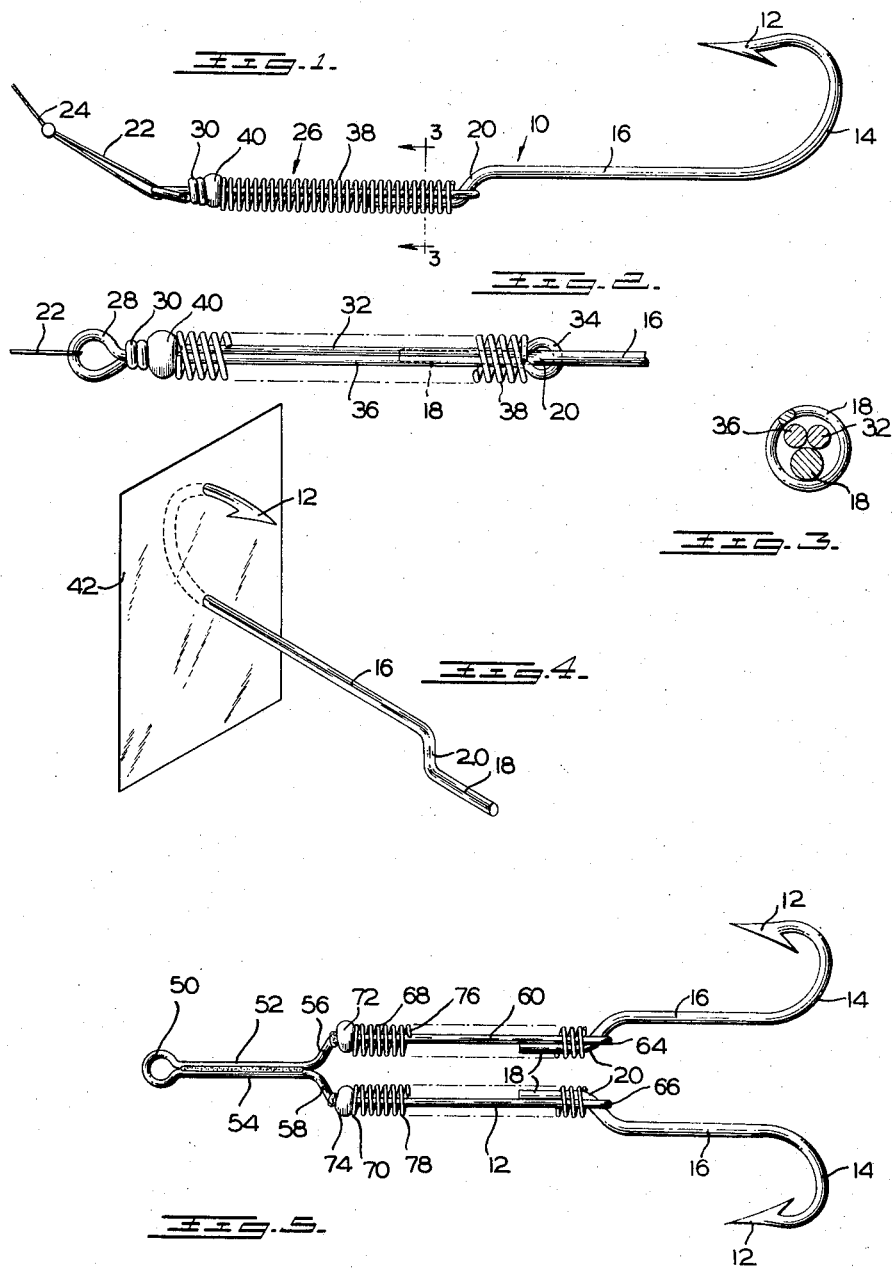
INVENTOR
LOREN E. MOHN
BY *Gustave Miller*
ATTORNEY Feb. 3, 1959
L. E. MOHN
2,871,612
FISH HOOK RELEASE UNIT
Filed Feb. 27, 1957
3 Sheets-Sheet 2
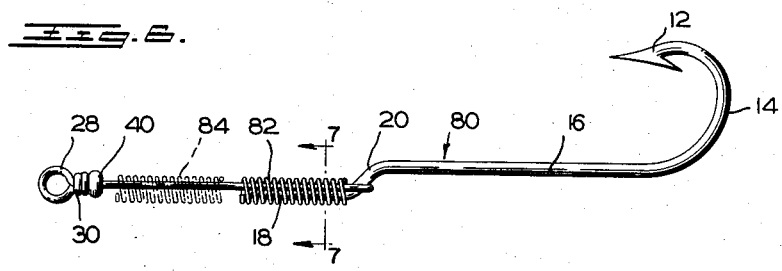
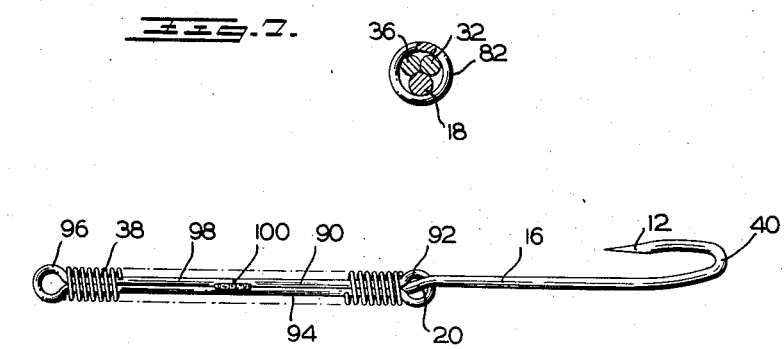
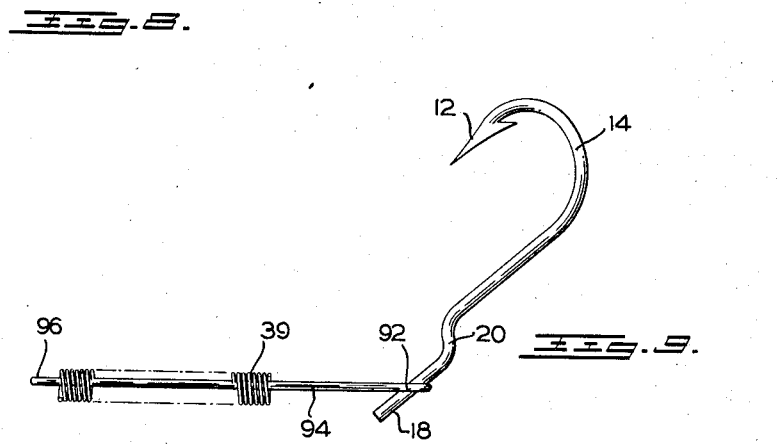
INVENTOR
LOREN E. MOHN
BY *Gustave Miller*
ATTORNEY Feb. 3, 1959        L. E. MOHN        2,871,612
FISH HOOK RELEASE UNIT
Filed Feb. 27, 1957        3 Sheets-Sheet 3
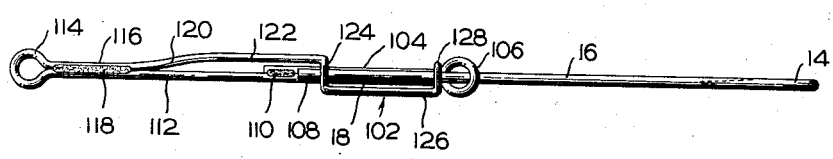
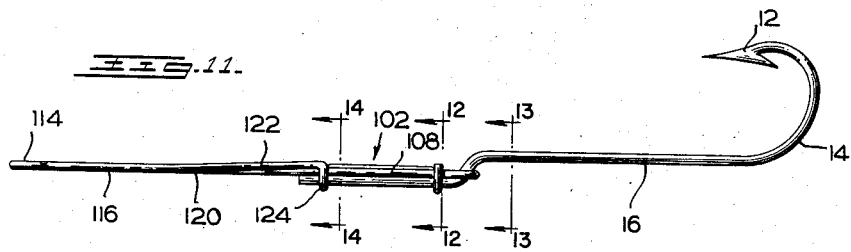
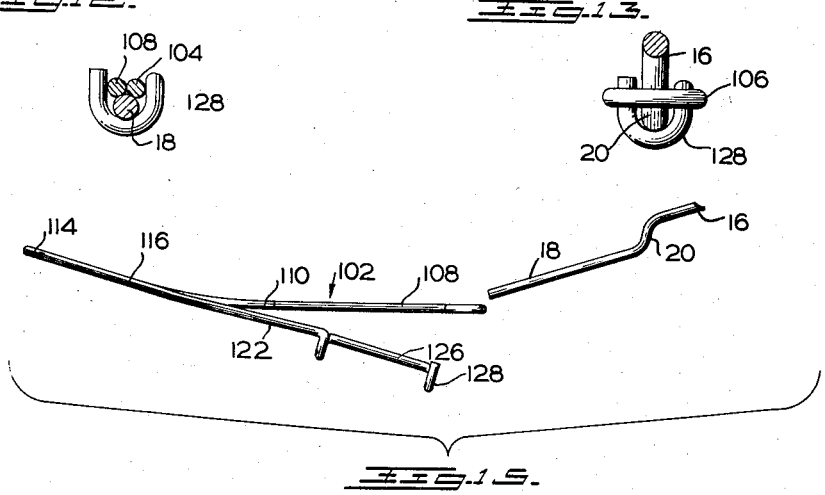
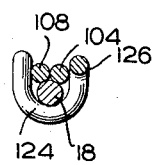
INVENTOR
LOREN E. MOHN
BY *Gustave Miller*
ATTORNEY United States Patent Office 2,871,612
Patented Feb. 3, 1959

2,871,612

FISH HOOK RELEASE UNIT

Loren E. Mohn, Elmore, Minn., assignor of one-half to Elmer J. Mohn, Elmore, Minn.

Application February 27, 1957, Serial No. 642,808

7 Claims. (Cl. 43—44.83)

This invention relates to a fish hook barb release unit and has for an object to provide an improved fish hook wherein the hook barb is readily releasable from the shank when desired and which is securely fastened to the shank for fishing operations.

A further object of this invention is to provide a fish hook barb release unit wherein the barb can be readily detached from the shank attached to a fishing line so as to release the fish from the hook barb more readily and in a more humane manner than in withdrawing the barbed end of the hook forceably in the usual manner.

A further object of this invention is to prevent tearing or mutilation of the tissue lips, tongue, gills, or gullets of the fish when removing the hook from the fish that has been caught, which is particularly important when undersized or out of season fish have been hooked and which should be released with a minimum of injury so that they may survive.

A further object of this invention is to facilitate easy removal of the hook barb when accidentally caught in clothing of any kind or when caught in any part of the fisherman, the hook barb being releasable from the shank so that it may be pulled through and out of the object in which it is caught without tearing or enlarging the hole already made by the hook.

A further object of this invention is to provide a fish hook barb release unit wherein the hook barb may be readily released from the hook shank by mere manual manipulation without the use of any tools, and wherein the invention may be made in any way of several forms, and furthermore wherein a plurality of hook barbs may be detachably secured to a shank from one single leader.

With the above and related objects in view, this invention consists in the details of construction and combination of parts, as will be more fully understood from the following description, when read in conjunction with the accompanying drawing in which:

Fig. 1 is a side elevational view of one form of fish hook release unit of this invention.

Fig. 2 is a fragmentary enlarged detail view of the hook shank and shank securing means looking down at the top of Fig. 1.

Fig. 3 is a sectional view on line 3—3 of Fig. 1.

Fig. 4 is a perspective view of a hook barb caught in a piece of material such as clothing.

Fig. 5 is a top elevational view of a multiple barb fish release unit.

Fig. 6 is a side elevational view of another form of fish hook release unit of this invention.

Fig. 7 is a sectional view on line 7—7 of Fig. 6.

Fig. 8 is a side elevational view of still another form of fish hook release unit of this invention.

Fig. 9 is an elevational view showing the fish hook barb of Fig. 8 in the process of being removed.

Fig. 10 is a bottom elevational view of still another form of fish hook release unit of this invention.

Fig. 11 is an elevational view looking down at the top of Fig. 10.

Figs. 12, 13 and 14 are sectional views on lines 12—12, 13—13, and 14—14 of Fig. 11.

Fig. 15 is a fragmentary view showing the fish hook barb of Figs. 10 to 14 in the process of being removed.

There is shown at 10 one form of fish hook release unit of this invention. In this form there is provided a fish hook barb 12 on a fish hook 14 having a shank 16 connected to the hook 14. The shank 16 is connected to a terminal shank portion 18 extending parallel thereto and integrally connected thereto by an off-set shank portion 20 bent at an angle to the parallel shank portions 16 and 18. As is obvious, the connecting shank portion 20 is formed by bending the terminal shank portion 18 away from the hook shank 16 and then bending it back again in off-set relation thereto but parallel thereto thereby providing the connecting shank portion 20.

As thus clearly obvious the hook 14 with its barb and shank portions is an integral separate element.

In order to connect the fish hook 14 to a leader 22 of a fishing line 24, there is provided a holding and releasing means 26 for readily holding and releasing the hook 14. This holding and releasing means 26 consists of a wire rod bent at one end into a leader securing eye 28 having its end twisted around itself as at 30, the rod from the other end extending along as at 32 for a distance, then bent into a fish hook shank receiving eye 34 and then back again adjacent to and parallel to the wire rod portion 32 in a parallel wire rod portion 36 terminating adjacent the leader eye 28 and secured in position by the twisted end 30. Looped about the wire rods 32 and 36 is a coil spring 38 having a suitable diameter that it can bias against the leader eye 34 at one end and against either the hook eye 34 at one end and against either the leader eye 28 at the other end or a brass or glass bead 40 abutting against the twisted end 30. As shown in Figs. 1 and 2, and 3, the hook shank terminal portion 18, which may be of greater diameter than the wire rods 32 and 36, when in mounted position, has its angular portion 20 extending through the hook shank receiving eye 34, and the terminal portion 18 is held by the loops of the coil spring 38 parallel to the wire rods 32 and 36 and in close proximity thereto, being held in substantially abutting relation between the two rods 32 and 36.

In operation, the hook 14 as thus assembled is used for fishing in the usual and normal manner held by the leader 22 on a fish line 24. The coil spring 38, it will be noted, is in its expanded condition biased between the hook eye 34 and the bead 40, in which condition the loops of the coil spring 38 extend over and hold the terminal shank portion 18 parallel to the loop and snugly against the wire rods 32 and 36, incapable of being removed from the hook eye 34 so long as the coil spring 38 is in normal expanded condition. When a fish has been caught on the hook, or the hook barb 12 has penetrated any other object such as the piece of material 42, it is desirable that the fish or piece of material 42 be removed from the hook 14 without having the barb 12 tear the material or the fish and make the hole any larger than it already is. To do this, the hook 14 is first removed from the holding and releasing means 26. To remove the hook 14, it is only necessary to grasp the end of coil spring 38 adjacent the hook shank receiving eye 34 and compress it downwardly toward the biasing bead 40 to beyond the end of the terminal shank portion 18, whereupon the bent shank portion 20 will easily slide out of the hook shank eye 34 followed by the terminal shank portion 18 thus separating the hook 14 from the holding means 26. Then, the fish or material 42, instead of being withdrawn over the barb 12, will be passed over the shank 16, angler portion 20 and terminal shank portion 18 to be released therefrom.

Then, to reassemble the unit, the coil spring 38 is again compressed toward the bead 40 whereupon the terminal shank portion 18 is inserted through the shank receiving eye 34 brought up into close proximity parallel to the wire rods 32 and 36 and the coil spring 38 is then released, making the entire unit ready for operation again.

Obviously, the hook shank 16 and hook 14 may be made of any desired gauge, either the same gauge throughout, or of different gauge in different portions thereof, dependent on the size of hook 14 and barb 12 that is formed thereon and dependent on the type of fishing for which it is to be used.

As just described, a single hook 14 is provided for use from a single leader 22, but if desired the invention may be formed with two or more hooks branching off a single leader receiving eye 50 as shown in Fig. 5. As shown in this form of invention, the wire rod having the leader receiving eye 50 extends therefrom in two connected portions 52 and 54 for a short distance and are offset as at 56 and 58 into two parallel but spaced apart portions 60 and 62. Each wire rod 60 and 62 is formed into a hook shank receiving eye 64 and 66 which then runs back parallel to the visible wire rod portions 60 and 62 and terminates in ends 68 and 70, beads 72 and 74 being provided each for biasing ends 68 and 70 of springs 76 and 78 whose other ends are biased against the shank receiving eyes 64 and 66. Hooks 14 substantially identical with that previously described and having similar shanks 16 and hook barbs 12 are extended through the eyes 64 and 66 and have their terminal shank portions 18 held by the coil springs 76 and 78 in the manner previously described.

In Figs. 6 and 7, another form of this invention is shown, this form of invention shown at 80 in Fig. 6 differing from the form shown in Figs. 1, 2, and 3 in that a coil spring 82 is provided that is substantially shorter than the coil spring 36, and is just long enough to extend about the terminal shank portion 18. In describing this form of invention, the same reference numerals are used where the parts are identical in construction and operation with the parts shown in Figs. 1, 2, and 3. In this form, the coil spring 82 is of such diameter that when it is fitted over the terminal shank portion 18 in position against the wire rods 32 and 36 as shown in Fig. 7, it is a snug frictional fit and thus remains in this position unless forceably removed to the position shown in dot-dash outline at 84. In the position shown at 84, the coil spring 82 is completely disengaged from the terminal shank portion 18 allowing it to be removed through the shank eye 34 in the manner previously described. Otherwise, the construction and operation is identical with that described in connection with Figs. 1, 2 and 3, except that instead of compressing the coil spring 82 it is merely shifted to the position at 84 to disengage the terminal shank portion 18 and then later is pushed back to the position at 82 to engage and hold the shank terminal portion 18 and thus hold the hook 14 in assembled operative position.

In the form of invention shown in Figs. 8 and 9, the biasing bead has been omitted, and a wire rod 90 is here shown as being looped into a shank receiving eye 92 then a parallel wire rod 94, that is parallel to the wire 90, extends a distance and then is looped into a leader receiving eye 96 and back into a second portion of wire rod 98 parallel the wire rod 90 and having its end 100 abutting against and soldered or welded to the end of wire rod 90.

A coil spring 38 identical with the coil spring shown in Figs. 1, 2, and 3 is biased between the leader eye 96 and the shank receiving eye 92 holding the shank terminal portion 18 in position parallel to and against the wire rod portions 90 and 94, but releasing the terminal shank portion 18 as shown in Fig. 9 when the coil spring 38 has been compressed manually to the position shown at 39 in Fig. 9 permitting the hook 14 to be removed therefrom by withdrawing the shank portion 18 from the shank receiving eye 92.

In Figs. 10 to 15 still another form of the invention is shown, utilizing the same hook 14 with its barb 12, shank 16 and offset terminal shank portion 18 connected thereto by the angular or bent shank portion 20.

In this form the holding and releasing means 102 includes a wire rod portion 104 formed into a shank receiving eye 106 and extending back parallel to the wire rod 104 at 108 being soldered or welded thereto as at 110. The wire rod 104 then continues as at 112 to form a leader receiving eye at 114 and then back again as at 116 parallel to the portion 112 for a short distance and soldered thereto as at 118 and then offset a slight amount as at 120 and parallel again as at 122 and then forms into a U-shaped loop 124, from whence it may continue in an arm 126 terminating again in a similar U-shaped loop 128.

The first-mentioned U-shaped loop 124 is spaced a distance from the shank receiving eye 106 slightly less than the length of the hook shank terminal portion 18, and the second U-shaped loop 128 may or may not be present.

The offset wire rod portion 120 and the wire rod portions 122 and 112 each have sufficient inherent resiliency or springiness therein that they constantly tend to urge and hold the loop 124 and also the loop 128 in a position over and embracing the parallel wire rod portions 104 and 108 as shown in Figs. 10, 11, 12, 13, and 14, but permitting the loop 124 together with the arm 126 and second loop 128 to be bent away therefrom as shown in Fig. 15, whereupon the terminal shank portion 18 may be inserted through or removed from the shank receiving eye 18, to be held in parallel position against the wire rods 104 and 108 when inserted through the eye 106 and the loops 124 and 128 are permitted to embrace them as shown in Figs. 12, 13, and 14. In operation, the wire rods 120 and 122 are bent away from the wire rod 112 to the position shown in Fig. 15 permitting the terminal shank portion 18 to be inserted or removed as desired.

There is thus shown a fish hook release unit in which in its several forms, the fish hook may be readily and manually released from the fish hook holding and releasing means so that the hook may be withdrawn from whatever object it is hooked in without the necessity of pulling the barb 12 through the object, but permitting the hook to be removed by pulling it through the hole already made along the shank 16, the offset angular bent portion 20 and terminal shank portion 18, so that the hole in the object is not enlarged, and the object is not further torn or mutilated.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fish hook barb release unit comprising a fish hook and a fish hook holding and releasing device, said fish hook comprising a fish hook barb, a hook shank, said hook shank having an offset terminal shank portion extending parallel to the shank portion from which the hook barb extends, said hook shank barb portion and said terminal shank portion being integrally connected together by a bent connecting shank portion, said fish hook holding and releasing device comprising a wire rod having a fish line leader securing eye at one end thereof and a hook terminal shank receiving eye at the other end thereof, a second wire rod extending parallel to said first wire rod in close proximity thereto at the hook shank receiving eye end thereof, said hook shank terminal receiving eye integrally connecting said second wire rod to said first wire rod, and loop means yieldably held over said two parallel wire rods, said offset terminal shank portion being arranged to extend through said hook shank receiving eye and lie parallel to said two parallel wire rods, said loop means releasably securing said terminal shank portion parallel to and against said two parallel wire rods.

2. The fish hook unit of claim 1, said hook shank receiving eye integrally connecting said second wire rod to said first wire rod.

3. The fish hook barb release unit of claim 1, said yieldable loop means comprising a U-shaped loop integrally extending from a yieldable spring shank in turn integrally extending from said fish line leader securing eye, said U-shaped loop being spaced from said hook terminal shank receiving eye.

4. The fish hook barb release unit of claim 1, said yieldable loop means comprising a U-shaped loop integrally extending from a yieldable spring shank in turn integrally extending from said fish line leader securing eye, said U-shaped loop being spaced from said hook terminal shank receiving eye, and a second U-shaped loop integrally connected to said first U-shaped loop by a shank, said second U-shaped loop being located adjacent to said hook terminal shank receiving eye.

5. The fish hook barb release unit of claim 1, said loop means comprising a spring means embracing said two parallel wire rods between said two end eyes thereof, said spring means being movable away from said hook shank receiving eye whereby to disengage said loop means from said two parallel wire rods at the hook shank receiving eye end thereof thereby permitting said terminal shank portion to be extended through said shank receiving eye to said bent connecting shank portion, or to be removed therefrom.

6. The fish hook barb release unit of claim 5, said spring means comprising a coil spring extending about said wire rods between said wire rod eyes compressible away from said hook shank receiving eye.

7. The fish hook barb release unit of claim 5, said spring means comprising a coil spring extending between said wire rod eyes, partly about said wire rods and slidably away from said hook shank receiving eye.

References Cited in the file of this patent

UNITED STATES PATENTS

| | | |
|---|---|---|
| 1,307,411 | Moore | June 24, 1919 |
| 2,591,891 | Thorsen | Apr. 8, 1952 |